United States Patent

[11] 3,626,031

[72] Inventors Robert R. Chambers
 Scarsdale, N.Y.;
 Henry V. Isaacson, Minneapolis, Mich.;
 David W. Young, Homewood, Ill.
[21] Appl. No. 734,202
[22] Filed June 4, 1968
[45] Patented Dec. 7, 1971
[73] Assignee Atlantic Richfield Company
 Continuation-in-part of application Ser. No. 607,150, Jan. 4, 1967, now Patent No. 3,472,772. This application June 4, 1968, Ser. No. 734,202

[54] VINYL HALIDE POLYMER STABILIZED WITH PARTIAL ESTER SALT OF MALEIC ANHYDRIDE-VINYL COMPOUND POLYMER
 6 Claims, No Drawings
[52] U.S. Cl. .................................................. 260/899,
 260/45.75, 260/78.5, 260/900
[51] Int. Cl. .................................................. C08f 29/22

[50] Field of Search ............................................ 260/899,
 78.5 T

[56] References Cited
 UNITED STATES PATENTS
| | | | |
|---|---|---|---|
| 3,483,159 | 12/1969 | Kauder .......................... | 260/45.75 |
| 3,005,802 | 10/1961 | Sellers .......................... | 260/78.5 |
| 2,892,786 | 6/1959 | Stewart et al. ................ | 252/51.5 |
| 2,707,178 | 4/1955 | Wilson .......................... | 260/45.5 |

Primary Examiner—Murray Tillman
Assistant Examiner—C. J. Seccurd
Attorney—McLean, Morton and Boustead ABSTRACT: Novel tin salts of partial esters of vinyl monomermal anhydride polymers, (e.g. styrene-maleic anhydride polymers), esterified with a thioalcohol or a hydroxythioether are formed by combination of the ammonium salt of said thioester and stannous chloride. Vinyl halide polymers are stabilized by incorporation of small amounts of these tin salts.

VINYL HALIDE POLYMER STABILIZED WITH PARTIAL ESTER SALT OF MALEIC ANHYDRIDE-VINYL COMPOUND POLYMER

This application is a continuation-in-part of our application Ser. No. 607,150, filed Jan. 4, 1967, now U.S. Pat. 3,472,722.

The present invention relates to certain metal salts, particularly the tin salts of thioalcohol-esterified and hydroxythioether-esterfied vinyl monomer-maleic anhydride polymers, and to vinyl halide polymers stabilized with small amounts of these tin salts. It has now been found that certain metal salts, e.g., the tin salts of these esters, exhibit stabilizing effects in, for instance, polyvinyl chloride compositions, e.g., PVC plastisols.

Vinyl halide resins, in general, are well know to the art and their desirable properties as components of solid plastic compositions of various types have been recognized. It is also known that vinyl halide resins are sensitive to both heat and light as manifested by discoloration. By way of illustration, in the compounding and processing of these resins into molded and extruded articles such as synthetic fibers and films, or as constituents of coating compositions, it is usually necessary to subject the resins to elevated temperatures. Under such conditions a tendency of the resins toward progressive yellowing or darkening is commonly encountered. Consequently, it has become the practice to incorporate small amounts of stabilizing materials into the resins to retard or inhibit this degradation or discoloration. Many stabilizers have been suggested for this purpose, the most prominent of which are the organometallic compounds, particularly those containing tin or lead, such as dibutyl tin, dibasic lead phosphate, dioctyl tin maleate, lead stearate, etc. Unfortunately, however, many of these stabilizers have not been found entirely satisfactory for one reason or another. Hence, there exists a continuing demand for new stabilizers.

The esterified polymers of the present invention are prepared by partially esterifying a vinyl monomer-maleic anhydride polymer with a compound having the general formula: R—S—R′ wherein R is a hydrocarbon radical of about one to 20, preferably about one to 12, carbon atoms and R′ is a radical selected from the group consisting of hydrogen and alkylols of about one to 24, preferably about one to 12 carbon atoms. Thus, suitable esterifying compounds are thioalcohols, known also as thiols and mercaptans, and hydroxythioethers, known also as thioetheralcohols. Preferably, R is alkyl. Illustrative esterifying compounds include, for example, methyl mercaptan, ethyl mercaptan, isooctyl mercaptan, ethylthioethanol, etc.

The reaction between the polymer and the esterifying compound takes place at the dicarboxylic anhydride sites of the polymer to form thioester or thioetherester linkages. Thus, the reaction of one mole of thioalcohol with sufficient vinyl monomer-maleic anhydride polymer to provide one mole of maleic anhydride unit, would yield a polymeric product having the following half-thioester of the maleic acid unit:

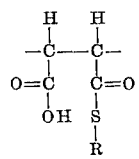

The percent, or extend of esterification of the polymer is a factor in determining the utility of the sulfurcontaining, esterified polymers of the invention. By "percent esterification" is meant the overall percentage of total potential carboxyl groups on the polymer chains that are in the form of the thioester group, i.e.

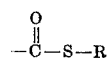

or in the form of the thioetherester group, i.e.,

—S—R, R representing the radical as defined above and R″ representing the residue of the alkylol radical of a hydroxythioether. "Potential carboxyl groups" include carboxyl groups as such and groups capable of yielding the carboxyl group by hydrolysis and having the formula:

where X is hydrogen, hydrocarbyl, metal or carbon (e.g., as in the case of the anhydride). Thus, for instance, where 25 percent of the total potential carboxy groups of the vinyl monomer-maleic anhydride polymer are esterified (25 percent esterification), the product is a polymer having 50 percent esterification based on half-esterification. The higher the percentage of esterification, the lower the solubility of the polymer in aqueous, alkaline media and the grater the organic solvent, e.g., hydrocarbon, solubility.

The present invention contemplates polymers which are esterified with the above sulfur-containing compounds in the range of about 5 to 95, preferably about 25 to 75 percent. Where it is desired to render the esterified polymer water-soluble, the percent esterification is also important from the standpoint of leaving enough unreacted carboxyl groups to permit sufficient alkali metal or ammonium salt formation to impart water solubility. Further, it may be desired to allow sufficient carboxyl groups to remain free for subsequent cross-linking reactions.

The esterification reactions can be conducted by known methods. Often, temperatures of about 50° C. to 200° C., preferably about 100° to 160° C., can be employed. The reaction may be conducted in bulk or in the presence of suitable solvents such as, for example, xylene, toluene, or an excess of the esterifying sulfur-containing compound. The reaction proceeds without the additional presence of catalyst; however, such may be employed, if desired, and as suitable catalysts may be mentioned lithium acetate and sodium methoxide. Reaction times can vary according to reactant proportions, the presence or absence of catalysts and diluents, temperature, pressure, etc. The main consideration as regards reaction time, however, is the extend of esterification sought.

The esterified polymers of the present invention are rendered water-soluble by conversion of unreacted carboxyl groups of the copolymer to their alkali metal or ammonium salt forms. Preparation of the salt can be by known methods such as by the addition of the thioesterified or thioetheresterified polymer to a hot aqueous solution of ammonium hydroxide. The tin salts are prepared by a subsequent addition of a tin salt, for example tin chloride, to the aqueous solution of the ammonium salt.

Similarly, an aqueous solution of the alkali metal salt of the polymer ester can be added to at least about stoichiometric amounts of an inorganic or organic salt of tin. Other salts can be used in place of tin chloride, such as water-soluble tin nitrates and acetates. It is preferred that the tin salt be in aqueous solution on addition of the alkali metal salt solution of the aqueous solution of the copolymer. Addition with continuous stirring provides the novel tin salts of the invention which are insoluble in the reaction medium and precipitate immediately out of solution. The tin salts of this invention give a colorless film.

In the tin salt of these esters the amount of tin is often about 10–25 percent by weight of the ester salt. Enough tin is present so that these ester tin salts are essentially water-insoluble even though they are made from a water-soluble ammonium or sodium salt.

The concentration of the tin salts of the copolymerester in the polyvinylhalide materials, which constitute the major amount of the composition of the invention, can vary but in all cases is a minor amount sufficient to stabilize the polyvinylhalide against degradation. Usually the additive concentration is about 0.01 percent to 5 percent by weight, preferably 0.25 to 2 percent, of the composition.

The polymer with which the sulfur-containing compounds are reacted to form the thioesters or thioether-esters of the present invention is a polymer of maleic anhydride and a polymerizable monovinyl compound of two to about 12 carbon atoms, these components being present in the polymer in a molar ratio of vinyl monomer to maleic anhydride of about 1:1 to 5:1, preferably 1:1 to 3:1. Suitable vinyl compounds include, for instance ethylene, propylene, isobutylene, butylene, pentylene, hexylene, heptylene, octylene, nonylene, decylene, dodecylene, methyl vinyl ether, ethyl vinyl ether, butyl vinyl ether, styrene, vinyl toluene, and the like. The preferred vinyl monomer is styrene. If desired, maleic acid can be used instead of maleic anhydride in formation of the polymer, and the use of the term "maleic anhydride" herein and in the claims is intended to include maleic acid.

The polymer contains repeating vinyl monomer and maleic anhydride units and, in unesterified form, may have an average molecular weight of about 400 to 18,000, preferably about 600 to 15,000. The melting point may generally range from about 80 to 300° C., and a 10 percent by weight solution of the polymer in acetone will generally exhibit a viscosity at 30° C. of up to about 2 centistokes, preferably less than about 1 centistoke.

Preparation of the vinyl monomer-maleic anhydride polymer can be by known methods. A preferred method is by solution polymerization where the monomers are polymerized in a suitable solvent employing as a polymerization catalyst a free-radical catalyst, such as a peroxide, preferably benzoyl peroxide, dicumyl peroxide, or an alkyl peroxy dicarbonate, at a temperature of about 75° to 300° C. or more. Suitable solvents include the aromatic hydrocarbon solvents, such as cumene, p-cymene, xylene, toluene, etc. Other suitable solvents are the ketones, such as methylethylketone. The preferred manner of carrying out the polymerization is by what is known as incremental feed addition. By this method the monomers and catalyst are first dissolved in a portion of the solvent in which the polymerization is to be conducted and the resulting solution fed in increments into a reactor containing solvent heated to reaction temperature, usually the reflux temperature of the mixture.

When an aromatic solvent is employed as the solvent for the polymerization, the formation of the copolymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation.

Typical properties of, for example, styrene-maleic anhydride resins from which the tin salts of the thioesters or thioetheresters of the present invention can be prepared are as follows:

TABLE I

| Resin | A | B | C | D |
|---|---|---|---|---|
| Form | Powder | POwder | Powder | Powder |
| Average Molecular Weight | 1600 | 1700 | 1700 | 400–600 |
| Melting Range, °C. | 165–180 | 140–160 | 115–130 | 80–100 |
| Acid No. | 500 | 366 | 275 | 400 |
| Kinematic Vis. at 30° C. (in acetone, 10% conc.), centistokes | 0.67 | 0.73 | 0.78 | 0.5 |
| Ratio of Styrene to Maleic Anhydride in Polymer | 1:1 | 2:1 | 3:1 | 1:1 |

As employed herein, the term "vinyl halide resin" is meant to include those resins prepared by the polymerization of a vinyl halide either alone, or in conjunction with other ethylenically unsaturated polymerizable monomers, such as vinylidene chloride, acrylonitrile, styrene, vinyl esters of aliphatic acids, as for instance vinyl acetate, alkyl esters of monoolefinic acids, as for instance, dialkyl fumerate or maleate, and the like; and also vinylidene chloride polymer. The monomers other than the vinyl halide often are of two to 10 carbon atoms and preferably are monovinyl structures having an alpha olefin bond. The solid vinyl halide resin concerned with here is ordinarily the major constituent, preferably at least about 75 percent of the vinyl halide resin, and is preferably the chloride, although the other halides, such as the bromide and fluoride, are also contemplated, Other ethylenically-unsaturated monomers which can constitute the minor portion of the vinyl halide resin are often present in an amount up to about 25 percent or up to about 10 percent, more commonly about 5 percent by weight. The vinyl halide resins generally have Staudinger molecular weights of about 30,000 to 150,000, preferably about 50,000 to 75,000. The invention is of particular merit when applied to vinyl halide resins prepared by the polymerization of vinyl chloride either alone or in conjunction with acrylonitrile, vinylidene chloride or both, or with vinyl acetate, and especially the vinyl chloride-vinyl acetate polymer resins.

If desired, other known stabilizers can be utilized in combination with the stabilizer of the present invention. It is also to be understood that other ingredients commonly added to vinyl halide resin compositions such as plasticizers, pigments, dyes, fillers, etc., may also be incorporated into the vinyl halide resins. Among the more popular plasticizers, for instance, are the monomeric ester plasticizers obtained from the reaction of a carboxylic acid and an alcohol having four to 12 carbon atoms. Examples of suitable plasticizers are dioctyl phthalate, di-2-ethylhexylphthalate, isooctyl sebacate, isooctyl adipate, and polyester polymers of polyalkanols and polycarboxylic acids.

The following examples, which are to be considered illustrative only and not limiting, describe the preparation of the novel products and compositions of the present invention.

EXAMPLE I

Into a 500 ml. resin kettle was added a mixture of the styrene-maleic anhydride polymer (150 grams) identified in table I as "Resin A" and 2-methyl-2-heptanethiol, known synonymously as tert-octylmercaptan, (55 grams). The kettle was immersed in an oil bath at 200° C. and kept there for five hours with stirring, the resin thus treated was then precipitated in acetone and dried. The resulting product was an approximately 50 percent half-thioester of the styrene-maleic anhydride polymer. The product analyzed: 71.46 wt. percent C, 6.30 wt. percent H, and 3.05 wt. percent S.

The ammonium salt was prepared by addition of the thioester to a warm (50° C.) solution of ammonium hydroxide. The ammonium salt of the thioester was then precipitated in acetone and dried. The analysis of the resultant ammonium salt is as follows: 71.96 percent C; 6.6 percent H; 3.21 percent S.

Tin salt of the above thioester was prepared as follows:

Thirty-five grams (35 gm.) of the thioester was dissolved in a warm dilute solution $NH_4OH$. A 10 percent solution of $SnCl_2$ (25 gm.) in water was then added dropwise to ammonium salt solution, and the tin salt precipitated out. The salt was then washed with acetone and dried for 5 days at room temperature in a vacuum over $CaCl_2$.

Analysis of the tin salt of the tert-octylthioester of styrene-maleic anhydride polymer showed 16.2 percent Sn.

EXAMPLE II

A mixture of the styrene maleic-anhydride polymer (101 grams) identified in table I as "Resin A" and ethyl thioethanol (26 grams) was heated in a resin pot with agitation at 200° C. for five hours. After precipitation in acetone and drying, the ammonium salt of the hydroxythioetheresterified polymer was prepared by reaction with hot, aqueous ammonium hydroxide. The salt analyzed: 62.29 wt. percent C, 7.07 wt. percent H, and 4.96 wt. percent S. The tin salt is prepared from the ammonium salt in the same manner as shown in example I.

EXAMPLE III

The tin salt of the thioester as made in example I was tested as a stabilizer for the fusion of polyvinylchloride plastisols (Geon 121). The tin salt of the thioester was tested against a commercial stabilizer basic lead phosphate ("Dyphos PG"), and the commercial di-butyl tin dilaurate. The polyvinylchloride plastics tested are shown below in the following table:

TABLE I

| Test | A | B | C | D |
|---|---|---|---|---|
| Polyvinylchloride plastisols (Geon 121), g | 100 | 100 | 100 | 100 |
| Di-2-ethyl hexyl phthalate (plasticizer), g | 65 | 65 | 65 | 65 |
| Dyphos PG (basic lead phosphate), g | 1 | | | |
| Tin salt of tert-octylthioester of styrene-maleic anhydride polymer, g | | 1 | | |
| Dibutyl tin dilaurate, g | | | 1 | |

The plastisols were fused by drawing down a 1 mil film on a glass plate and then placed in a circulating air oven at 355° F. The samples were removed from the oven at 5 minute intervals up to 25 minutes. The extent of discoloration of the fused film is shown in table II whereby B (with tin salts of example I) and C (with dibutyl tin dilaurate showed best results for heat stability of resin.

TABLE II

| Test | A | B | C | D |
|---|---|---|---|---|
| Stabilizer | Dyphos PG. | Tin salt of thioesters of styrene-styrene-maleic anhydride polymer. | Dibutyl tin dilaurate. | Control, no stabilizer. |
| 5 minutes | Good | Good | Good | Good. |
| 10 minutes | do | do | do | Very faint discoloration. |
| 15 minutes | Starting discoloration. | do | Faint discoloration. | Discoloration. |
| 20 minutes | Bad | Faint discoloration. | Bad | Bad. |
| 25 minutes | Bad | Slight discoloration. | Bad | Bad. |

To test the effect of weight percent of additive stabilizer on the results, the following runs were made as shown in the following table:

TABLE III

| Test | $A_2$ | $B_2$ | $C_2$ | $D_2$ |
|---|---|---|---|---|
| Polyvinylchloride plastisol (Geon 121), g | 100 | 100 | 100 | 100. |
| Di-2-ethyl hexylphthlate, g | 65 | 65 | 65 | 65. |
| Tin salt of thioester of styrene-maleic anhydride polymer of Example I | 0.1 | 0.05 | | |
| Dibutyl tin dilaurate | | | 0.1 | 0.5. |
| 5 minutes | Good | Good | Good | Good. |
| 10 minutes | do | do | do | Do. |
| 15 minutes | do | do | Faint change. | Bad. |
| 20 minutes | do | Faint change. | Bad | Very bad. |
| 25 minutes | Discoloring spot. | do | Bad | Bad. |

It is claimed:

1. A stabilized vinyl halide resin composition comprising solid vinyl halide resin having incorporated therein a small amount, sufficient to retard degradation, of the tin salt of a partially esterified vinyl monomer-maleic anhydride polymer having a molar ratio of vinyl monomer to maleic anhydride of about 1:1 to 5:1 and an unesterified molecular weight of about 400 to 18,000 said vinyl monomer having two to about 12 carbon atoms, wherein about 5 to 95 percent of the carboxyl groups in said polymer are esterified with a compound corresponding to the formula: R—S—R' wherein R is a hydrocarbon radical of about one to 20 carbon atoms and R' is a monovalent radical selected from the group consisting of hydrogen and alkylols of about one to 24 carbon atoms.

2. A stabilized vinyl halide resin composition of claim 1 wherein said vinyl monomer is styrene.

3. A stabilized vinyl halide resin composition of claim 2 wherein said polymer is esterified with tertoctylmercaptan.

4. A stabilized vinyl halide resin composition having incorporated therein from about 0.01 to 5 percent by weight of the tin salt of the esterified polymer of claim 2.

5. A stabilized vinyl halide resin composition of claim 2 wherein R is alkyl.

6. A stabilized vinyl halide resin composition of claim 5 wherein the molar ratio of styrene to maleic anhydride in said polymer is approximately 1:1.

* * * * *